(12) United States Patent
Bacha

(10) Patent No.: US 9,965,391 B2
(45) Date of Patent: May 8, 2018

(54) ACCESS CACHE LINE FROM LOWER LEVEL CACHE

(71) Applicant: Hewlett Packard Enterprise Development LP, Houston, TX (US)

(72) Inventor: Anys Bacha, Dublin, OH (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days. days.

(21) Appl. No.: 15/316,885

(22) PCT Filed: Jun. 30, 2014

(86) PCT No.: PCT/US2014/044890
§ 371 (c)(1),
(2) Date: Dec. 7, 2016

(87) PCT Pub. No.: WO2016/003417
PCT Pub. Date: Jan. 7, 2016

(65) Prior Publication Data
US 2017/0123981 A1    May 4, 2017

(51) Int. Cl.
G06F 12/08 (2016.01)
G06F 12/0811 (2016.01)
G06F 12/02 (2006.01)
G06F 11/10 (2006.01)

(52) U.S. Cl.
CPC ...... *G06F 12/0811* (2013.01); *G06F 11/1004* (2013.01); *G06F 12/0223* (2013.01); *G06F 2212/62* (2013.01)

(58) Field of Classification Search
CPC .. G06F 12/0711; G06F 11/08; G06F 11/1004; G06F 11/22; G11C 29/00; G11C 29/04

USPC ............................. 711/122; 714/718, 25
See application file for complete search history.

(56) References Cited

U.S. PATENT DOCUMENTS

| | | | | |
|---|---|---|---|---|
| 5,793,941 A | * | 8/1998 | Pencis ............. | G06F 12/0897 711/E12.043 |
| 5,831,987 A | * | 11/1998 | Spilo ................ | G11C 29/10 714/42 |
| 6,170,070 B1 | * | 1/2001 | Ju ..................... | G11C 29/08 702/117 |

(Continued)

FOREIGN PATENT DOCUMENTS

| | | |
|---|---|---|
| TW | 440765 | 6/2001 |
| WO | WO-1998028713 | 7/1998 |

OTHER PUBLICATIONS

International Search Report and Written Opinion, Application No. PCT/2014/044890, dated Feb. 12, 2015, 9 pages.

(Continued)

*Primary Examiner* — Than Nguyen
(74) *Attorney, Agent, or Firm* — Hewlett Packard Enterprise Patent Department

(57) ABSTRACT

A first threshold number of cache lines may be fetched to populate each of the ways of a first cache set of a higher level cache and each of the ways of a first cache set of a lower level cache. A second threshold number of cache lines may be fetched to map to the first cache set of the higher level cache and a second cache set of the lower level cache. The first threshold number of cache lines may be accessed from the second from the first cache set of the lower level cache.

15 Claims, 5 Drawing Sheets

(56) References Cited

U.S. PATENT DOCUMENTS

| | | | |
|---|---|---|---|
| 6,240,490 B1* | 5/2001 | Lyles, Jr. | G06F 12/0811 |
| | | | 711/141 |
| 6,701,461 B2* | 3/2004 | Oura | G01R 31/31722 |
| | | | 711/118 |
| 6,966,017 B2* | 11/2005 | Evans | G11C 29/12 |
| | | | 711/144 |
| 7,177,986 B2 | 2/2007 | Rowlands et al. | |
| 7,770,067 B2 | 8/2010 | Lockwood et al. | |
| 8,429,350 B2 | 4/2013 | Luick | |
| 2003/0051197 A1* | 3/2003 | Evans | G11C 29/12 |
| | | | 714/718 |
| 2008/0034187 A1 | 2/2008 | Stempel | |
| 2008/0140934 A1 | 6/2008 | Luick | |
| 2009/0006768 A1 | 1/2009 | Luick | |
| 2010/0262783 A1 | 10/2010 | Guthrie et al. | |
| 2014/0164748 A1 | 6/2014 | Dundas | |

OTHER PUBLICATIONS

Riga et al., "On the Functional Test of L2 Caches", 2012 IEEE 18th International On-Line Testing Symposium (IOLTS), Torino, Italy, 7 pages.

\* cited by examiner

ACCESS CACHE LINE FROM LOWER LEVEL CACHE

BACKGROUND

Due to the dynamics of the information era and its demanding nature, the bar for information technology (IT) companies to produce highly reliable equipment is constantly being raised. The reliability of IT equipment may be a significant factor to designing highly fault tolerant datacenters. As such, processor vendors may need to account for imperfections in the manufacturing process through the use of appropriate stress tests.

Such tests may ensure proper coverage to validate safe operation in the face of issues such as process variation and circuit aging prior to shipment. This problem may be exacerbated as the process technology continues to shrink making CMOS based designs less reliable. Caches are generally one of the most susceptible structures due to their sensitivity to imbalances in transistor behavior present in a given static random access memory (SRAM) cell.

BRIEF DESCRIPTION OF THE DRAWINGS

The following detailed description references the drawings, wherein.

DETAILED DESCRIPTION

Figure 1:
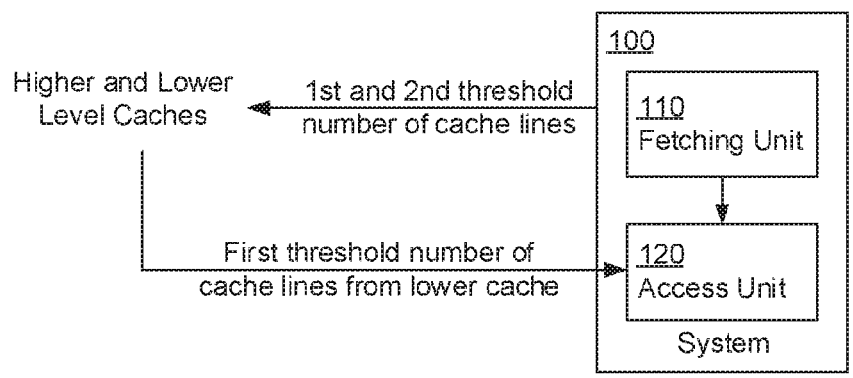
FIG. 1 is an example block diagram of a system to access a cache line from a lower level cache.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Many modern processors have multiple levels of caches. L1 caches are designed to absorb most memory transactions for the purpose of hiding latencies in execution. Because of this, lower level caches (e.g. L2, L3, etc.) are more difficult to access. In addition, L1 caches tend to be more robust than lower level caches due to the use of single-event (SE) hardened cells. Therefore, susceptibility to reliability issues may be expected to cluster in lower levels of the memory hierarchy such as L2 and L3 caches, where denser cells are used. This may increase the risk for test escapes in such cache components.

Examples may provide a dynamic mechanism for systematically targeting a specific cache line and/or set of cache lines in a processor. Examples may enable adequate stressing of cache lines that are beyond the first level cache through a burst of accesses to the same line. For instance, in an example method, a first threshold number of cache lines may be fetched to populate each of the ways of a first cache set of a higher level cache and each of the ways of a first cache set of a lower level cache. Then, a second threshold number of cache lines may be fetched to map to the first cache set of the higher level cache and a second cache set of the lower level cache. The first threshold number of cache lines may be accessed from the second from the first cache set of the lower level cache.

Having a software mechanism for targeting a given cache line in a stressful fashion at runtime may provide many benefits. First, software may eliminate the need for adding special hooks in hardware to enable targeted test coverage in lower level caches. Using hardware to perform such tests may increase the overall power consumption of the chip due to the additional logic needed to conduct such tests. This may be particularly relevant when considering processors such as system on chips (SoCs) that are inexpensive and geared toward low power operation. Further, examples may be architecture independent and may scale to different technologies such as resistive memory including Spin-transfer torque random-access memory (STT-RAM) and phase change memory (PCM).

While being software based, examples may effectively bypass the L1 cache for better focused testing of weaker memory cells in lower level caches such as L2 and L3. Having an ability to detect cache lines mapped to weaker cells through targeted testing facilitates an adaptive approach to disabling weak lines in the event of changes to the operating conditions, such as temperature after the system has been deployed. In addition, an online targeted test could be used to reliably operate in the Near Threshold Computing (NTC) range. This range may be suitable for low power operation especially in mobile devices and cloud based datacenters. As the voltage is aggressively lowered to approach the NTC range, process variation effects such as Random Dopant Factors (RDF) may become amplified.

Having a targeted cache line self-test may be used to isolate the weak lines to be disabled in order to drive the core voltage lower and achieve aggressive power savings. Finally, circuit aging in CMOS based designs may necessitate an ability to have online tests that could be periodically launched to isolate weakened cells after a processor has been deployed.

Thus, examples provide the ability to target cache lines in lower level caches by effectively bypassing the L1 cache without hardware intervention. Examples are relatively simple to implement and is scalable. Further, examples have the advantage of being inexpensive and power efficient relative to hardware since examples do not require additional circuitry that would consume power (dynamic and leakage power) for phases that are otherwise short lived. Examples may be adaptive as part of an online solution that could be periodically triggered to detect issues induced by changes in operating conditions and circuit aging. Examples also may enable low power operation, such as in the NTC range by effectively detecting and disabling weak cache lines to aggressively lower voltage.

Referring now to the drawings, FIG. 1 is an example block diagram of a system 100 to access a cache line from a lower level cache. The system 100 may interface with or be included in any type of device accessing a cache, such as a controller, a central process unit (CPU), a notebook computer, a desktop computer, an all-in-one system, a server, a network device, a wireless device, a storage device, a mobile device, a thin client, a retail point of sale device, a gaming device, a scientific instrument, and the like.

The system 100 is shown to include a fetching unit 110 and an access unit 120. The fetching and access units 110 and 120 may include, for example, a hardware device including electronic circuitry for implementing the functionality described below, such as control logic and/or memory. In addition or as an alternative, the fetching and access units 110 and 120 may be implemented as a series of instructions encoded on a machine-readable storage medium and executable by a processor.

The fetching unit 110 may fetch a first threshold number of cache lines and a second threshold number of cache lines, the first and second threshold number of cache lines to be loaded to a higher level cache and a lower level cache. The access unit 120 may access the first threshold number of cache lines. The second threshold number of cache lines may overwrite the first threshold number of cache lines at a first cache set of the higher level cache. The access unit 120 may access the first threshold number of cache lines from a first cache set of the lower level cache.

Figure 2:
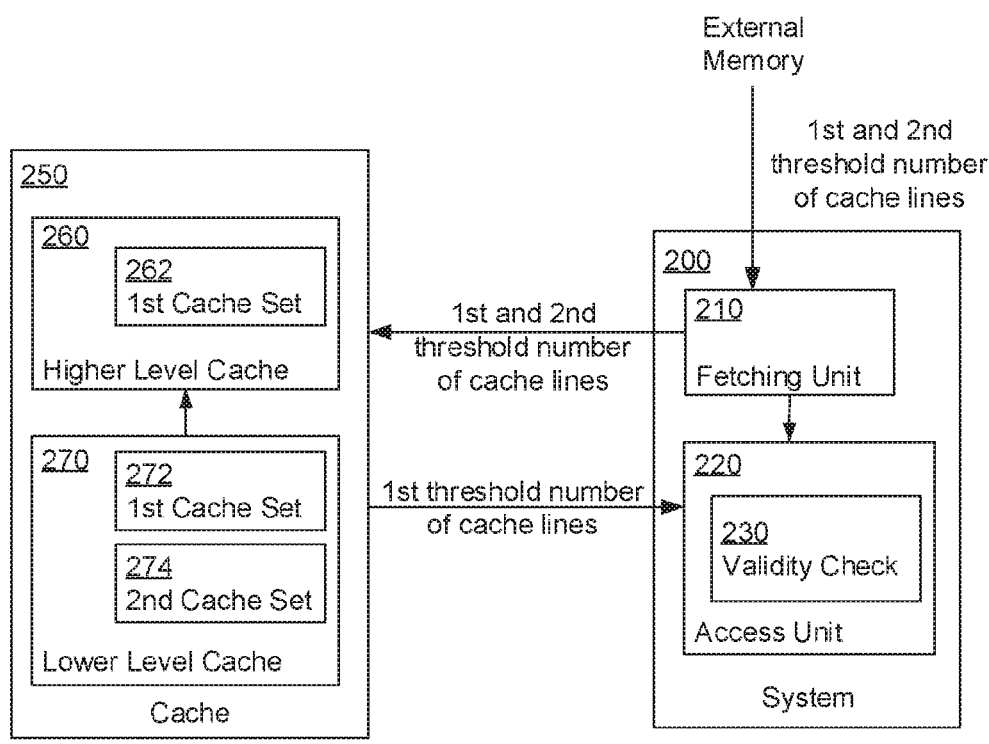
FIG. 2 is another example block diagram of a system to access a cache line from a lower level cache.
Figure 3A:
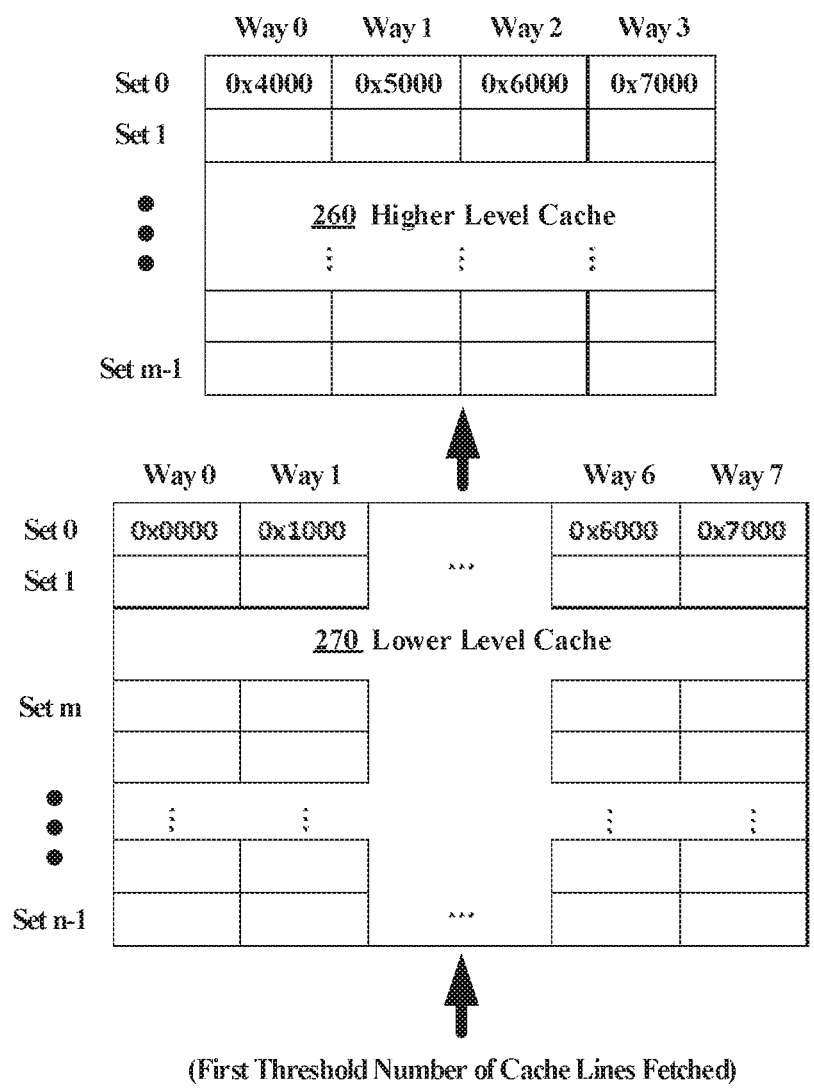
FIGS. 3A and 3B are example block diagrams of the cache of FIG. 2.
Figure 3B:
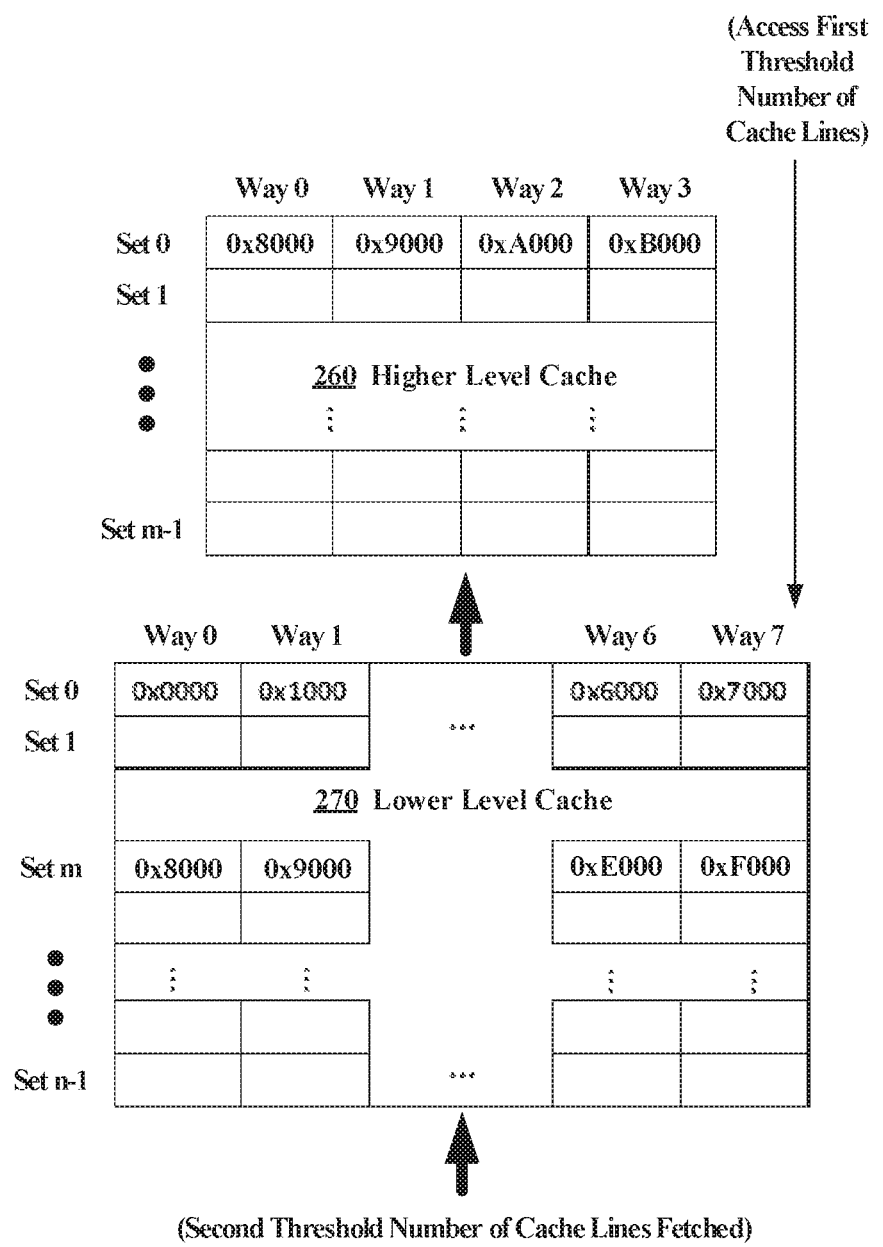

FIG. 2 is another example block diagram of a system 200 to access a cache line from a lower level cache. FIGS. 3A and 3B are example block diagrams of the cache of FIG. 2. The system 200 may interface with or be included in any type of device accessing a cache, such as a controller, a central process unit (CPU), a notebook computer, a desktop computer, an all-in-one system, a server, a network device, a wireless device, a storage device, a mobile device, a thin client, a retail point of sale device, a gaming device, a scientific instrument, and the like. Further, The system 200 of FIG. 2 may at least include the functionality and/or hardware of the system 100 of FIG. 1. For example, the system 200 includes a fetching unit 210 and an access unit 220 that respectively includes at least the functionality and/or hardware of the fetching and access units 110 and 120 of FIG. 1.

The cache 250 may be a block of memory for temporary storage of data likely to be used again. The cache 250 stores data so that future requests for that data may be served faster. The data that is stored within the cache 250 might be values that have been computed earlier or duplicates of original values that are stored elsewhere. The cache 250 may be used by the CPU (not shown) of a computer to reduce the average time to access memory. For example, the cache 250 may be a smaller, faster memory which stores copies of the data from frequently used main memory locations. The cache 250 may include an instruction cache to speed up executable instruction fetch and/or a data cache to speed up data fetch and store.

Larger caches may have better hit rates but longer latency. To address this tradeoff, some system may use multiple levels of cache, with small fast caches backed up by larger, slower caches. Multi-level caches generally operate by checking the smaller, faster cache first, such as a higher level cache 260. If there is a hit, the processor proceeds at high speed. Otherwise, if the higher level cache 260 misses, the next fastest cache, such as a lower level cache 270, may be checked, and so on, before external memory is checked.

If the system 200 includes a chip multiprocessor (CMP), a monarch or main thread is selected for each core within the CMP to run a self-test. Slave threads that haven't been selected as a monarch are halted in order to not induce any cache pollution while the main thread conducts the self-test. Once the slave threads have been halted, the main thread allocates memory to be used for the self-test.

The self-test is conducted after the main thread has been selected and memory has been allocated. The self-test may begin with the fetching unit 210 initially fetching a first threshold number of cache lines, such as from external memory, and then storing the first threshold number of cache lines to the cache 250. The first threshold number of cache lines may be stored to the higher and lower level caches 260 and 270.

As shown in FIG. 3A, the lower level cache 270 of the cache 250 may be greater in size than the higher level cache 260 of the cache 250. Here, the higher level cache 270 is shown to include m sets and 4 ways while the lower level cache is shown to include n sets and 8 ways, where n is greater than m. For example, n may be a multiple of m. Examples of the higher and lower level caches 260 and 270 may include more or less sets and/or ways.

The first threshold number of cache lines may include enough cache lines to populate each of the ways of a given cache set of the higher and lower level caches 260 and 270. Here, the first threshold number of cache lines may include 8 cache lines. In FIG. 3A, all of the cache lines are stored to first set of the lower level cache 270 but only half the cache lines are stored to first set of the higher level cache 260, due to fewer ways per set of the higher level cache 260. The first cache set 262 of the higher level cache 260 set may correspond to Set 0 of the higher level cache 260 and the first cache set 272 of the lower level cache 270 set may correspond to Set 0 of the lower level cache 260.

To get around the effects of the higher level cache 260 preventing accesses from reaching the lower level cache 270, the fetching unit 210 may fetch an additional second threshold number of cache lines. The newly fetched second threshold number of cache lines map to the previously used first set (Set 0) in the higher level cache 260, but map to a different set (Set m) in the lower level cache 270. This is because the lower level cache 270 may be a multiple in size of the higher level cache 260. This sequence results in the higher level cache 260 having different addresses in its cache tags (different from what's in the lower level cache 270). For example, as shown in FIG. 3B, the second threshold number of caches lines are stored to a second cache set 274 (Set m) of the lower level cache. However, the second threshold number of cache lines overwrites the first threshold number of cache lines at the first cache set 262 of the higher level cache 260.

When fetching the second threshold number of cache lines, the fetching unit 210 need only fetch enough cache lines to populate all the ways of the first cache set 262 of the higher level cache 260. Thus, while FIG. 3B shows the second threshold number of cache lines to include 8 cache lines, as few as 4 cache lines may suffice. The second threshold number of cache lines fetch different addresses than the first threshold number of cache lines To appropriately stress the cache lines and get around any Least Recently Used (LRU) effects present within cache designs, any of the first and second threshold cache lines that are fetched and stored to the cache 250 may be repeatedly accessed a third threshold number of times by the accessing unit 220, such as immediately following the fetching and multiple times in a tight loop. Thus, after the second threshold number of cache lines overwrites the first threshold number of caches lines at the first cache set 262 (Set 0) of the higher level cache 260, the first cache set 262 of the higher level cache 260 may include different addresses than the first cache set of the lower level cache 270.

Next, the access unit 220 may seek to access the first threshold number of cache lines, which are no longer at the higher level cache 260. Hence, the access unit 120 may access the first threshold number of cache lines from the first cache set 272 of the lower level cache 270. Therefore, the first threshold number of cache lines are retrieved directly from the first cache set 272 of the lower level cache 270 and without accessing the higher level cache 260. The higher level cache 260 may be a first level (L1) cache. The lower level cache 270 may be a second level (L2) and/or third level (L3) cache. Further, the higher level cache 260 may be any level cache that is hierarchically greater (e.g. smaller and/or faster) than the lower level cache 270.

Then, the access unit 220 may check validity 230 of the first threshold number of cache lines accessed from the first cache set 272 of the lower level cache 270. Checking the validity 230 may include, for example, detecting errors via error-correcting code (ECC) and/or comparing the values read from the first cache set 272 to values written to the first cache set 272.

The fetching unit 210 loads and/or stores data and/or instructions to the higher and lower level caches 260 and 270. For simplicity, examples are illustrated with the use of loads and stores. However, the same can be accomplished through instruction execution and appropriately placed branches to handle caches that are reserved for instructions only.

Figure 4:
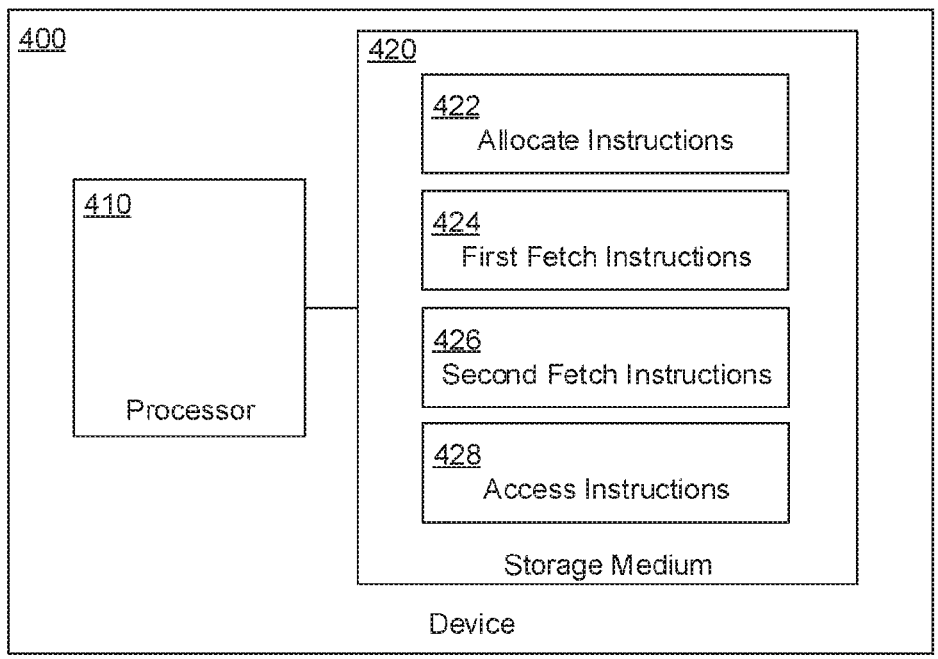
FIG. 4 is an example block diagram of a computing device including instructions for accessing a cache line from a lower level cache.

FIG. 4 is an example block diagram of a computing device 400 including instructions for accessing a cache line from a lower level cache. In the embodiment of FIG. 4, the computing device 400 includes a processor 410 and a machine-readable storage medium 420. The machine-readable storage medium 420 further includes instructions 422, 424, 426 and 428 for accessing a cache line from a lower level cache.

The computing device 400 may be or part of, for example, a controller, a central process unit (CPU), a notebook computer, a desktop computer, an all-in-one system, a server, a network device, a wireless device, a storage device, a mobile device, a thin client, a retail point of sale device, a gaming device, a scientific instrument, or any other type of device capable of executing the instructions 422, 424, 426 and 428. In certain examples, the computing device 400 may include or be connected to additional components such as memories, sensors, displays, etc.

The processor 410 may be, at least one central processing unit (CPU), at least one semiconductor-based microprocessor, at least one graphics processing unit (GPU), other hardware devices suitable for retrieval and execution of instructions stored in the machine-readable storage medium 420, or combinations thereof. The processor 410 may fetch, decode, and execute instructions 422, 424, 426 and 428 for accessing the cache line from the lower level cache. As an alternative or in addition to retrieving and executing instructions, the processor 410 may include at least one integrated circuit (IC), other control logic, other electronic circuits, or combinations thereof that include a number of electronic components for performing the functionality of instructions 422, 424, 426 and 428.

The machine-readable storage medium 420 may be any electronic, magnetic, optical, or other physical storage device that contains or stores executable instructions. Thus, the machine-readable storage medium 420 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 420 can be non-transitory. As described in detail below, machine-readable storage medium 420 may be encoded with a series of executable instructions for accessing the cache line from the lower level cache.

Figure 5:
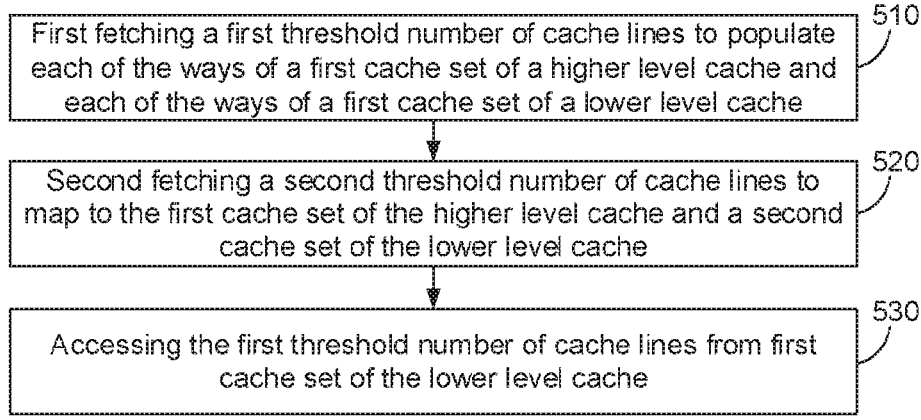
FIG. 5 is an example flowchart of a method for accessing a cache line from a lower level cache.

Moreover, the instructions 422, 424, 426 and 428 when executed by a processor (e.g., via one processing element or multiple processing elements of the processor) can cause the processor to perform processes, such as, the process of FIG. 5. For example, the allocate instructions 422 may be executed by the processor 410 to allocate memory at a higher level cache and a lower level cache. The first fetch instructions 424 may be executed by the processor 410 to fetch a first threshold number of cache lines to load to a first cache set of the higher and lower level caches.

The second fetch instructions 426 may be executed by the processor 410 to fetch a second threshold number of cache lines to overwrite the first cache set of the higher level cache and to store to a second cache set of the lower level cache. The access instructions 428 may be executed by the processor 410 to access the first threshold number of cache lines directly from the lower level cache. The memory may be allocated via a monarch thread and a slave thread may be halted while the lower level cache is accessed to test a validity of the first threshold number of cache lines.

FIG. 5 is an example flowchart of a method 500 for accessing a cache line from a lower level cache. Although execution of the method 500 is described below with reference to the system 200, other suitable components for execution of the method 500 can be utilized, such as the system 100. Additionally, the components for executing the method 500 may be spread among multiple system and/or devices (e.g., a processing device in communication with input and output devices). In certain scenarios, multiple devices acting in coordination can be considered a single device to perform the method 500. The method 500 may be implemented in the form of executable instructions stored on a machine-readable storage medium, such as storage medium 420, and/or in the form of electronic circuitry.

At block 510, the system 200 first fetches a first threshold number of cache lines to populate each of the ways of a first cache set 262 of a higher level cache 260 and each of the ways of a first cache set 272 of a lower level cache 270. Then, at block 520, the system 200 second fetches a second threshold number of cache lines to map to the first cache set 262 of the higher level cache 260 and a second cache set 274 of the lower level cache 270. Next, at block 530, the system 200 accesses the first threshold number of cache lines from the second from the first cache set 272 of the lower level cache 270.

Figure 6:
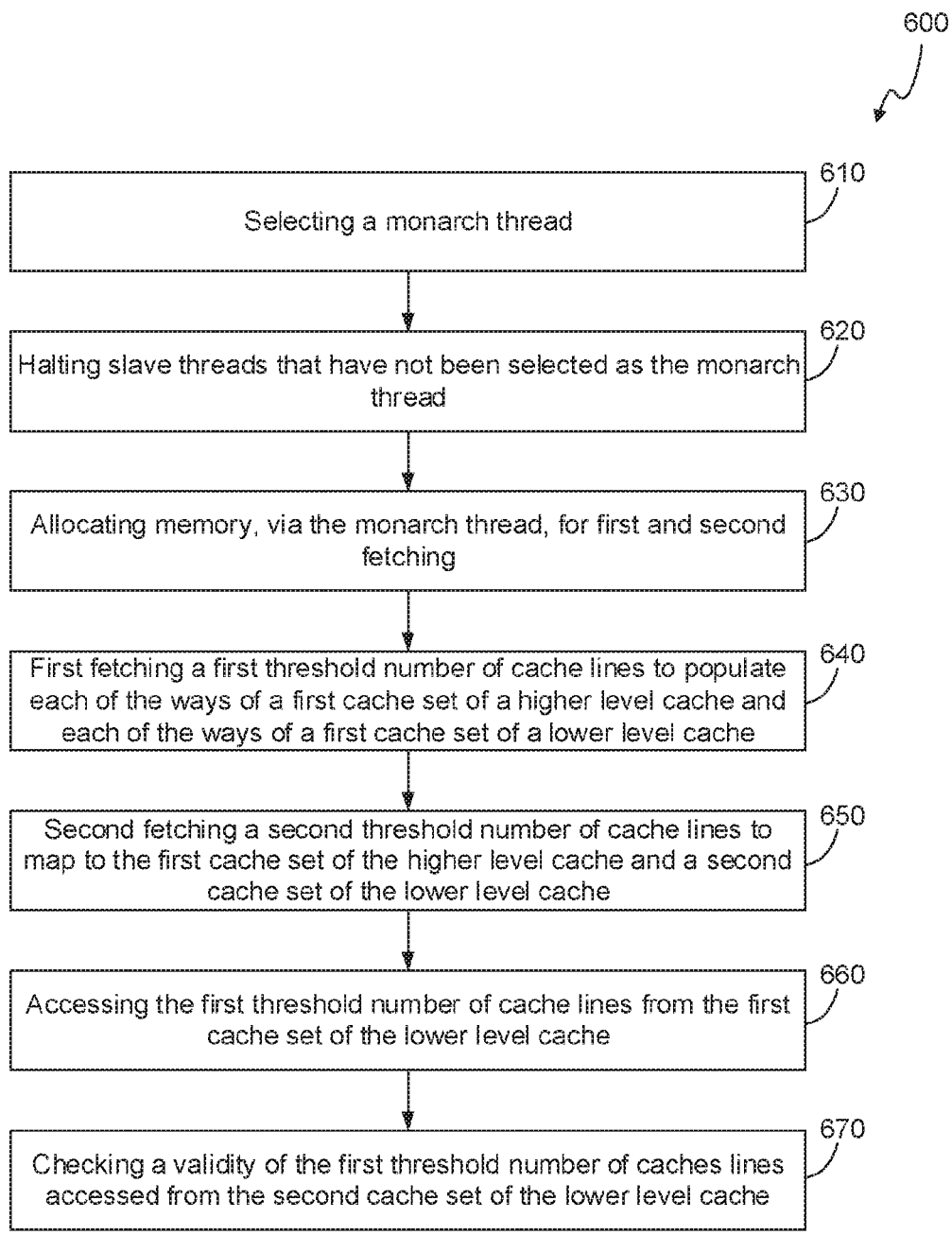
FIG. 6 is another example flowchart of a method for accessing a cache line from a lower level cache.

FIG. 6 is another example flowchart of a method 600 for accessing a cache line from a lower level cache. Although execution of the method 600 is described below with reference to the system 200, other suitable components for execution of the method 600 can be utilized, such as the system 100. Additionally, the components for executing the method 600 may be spread among multiple system and/or devices (e.g., a processing device in communication with input and output devices). In certain scenarios, multiple devices acting in coordination can be considered a single device to perform the method 600. The method 600 may be implemented in the form of executable instructions stored on a machine-readable storage medium, such as storage medium 420, and/or in the form of electronic circuitry.

At block 610, the system 200 selects a monarch thread. Then, at block 620, the system 200 halts slave threads that have not been selected as the monarch thread. Next, at block 630, the system 200 allocates memory, via the monarch thread, for the first and second fetching. At block 640, the system 200 first fetches a first threshold number of cache lines to populate each of the ways of a first cache set 262 of a higher level cache 260 and each of the ways of a first cache set 272 of a lower level cache 270.

Then, at block 650, the system 200 second fetches a second threshold number of cache lines to map to the first cache set 262 of the higher level cache 260 and a second cache set 274 of the lower level cache 270. Next, at block 660, the system 200 accesses the first threshold number of cache lines from the second from the first cache set 272 of the lower level cache 270. Lastly, at block 670, the system 200 checks a validity of the first threshold number of caches lines accessed from the first cache set 272 of the lower level cache 270.

I claim:

1. A method, comprising:
   first fetching a first threshold number of cache lines to populate each way of a first cache set of a higher level cache and each way of a first cache set of a lower level cache;
   second fetching a second threshold number of cache lines to map to the first cache set of the higher level cache and the first cache set of the lower level cache; and
   accessing the first threshold number of cache lines from the first cache set of the lower level cache.

2. The method of claim 1, further comprising:
   checking a validity of the first threshold number of caches lines accessed from the first cache set of the lower level cache.

3. The method of claim 2, wherein the checking the validity includes detecting errors via at least one of error-correcting code (ECC) and comparing the values read from the first cache set to values written to the first cache set.

4. The method of claim 2, wherein the accessing is repeated a third threshold number of times before the checking.

5. The method of claim 1, wherein the first threshold number of cache lines are retrieved directly from the first cache set of the lower level cache and without accessing the higher level cache.

6. The method of claim 1, further comprising,
   selecting a monarch thread;
   halting slave threads that have not been selected as the monarch thread; and
   allocating memory, via the monarch thread, for the first and second fetching.

7. The method of claim 1, wherein the second threshold number of cache lines is to overwrite the first threshold number of cache lines at the first cache set of the higher level cache.

8. The method of claim 1, wherein the first cache set of the higher level cache includes different addresses than the first cache set of the lower level cache.

9. The method of claim 1, wherein,
   the higher level cache is a first level (L1) cache, and
   the lower level cache is at least one of a second level (L2) and third level (L3) cache.

10. The method of claim 1, wherein,
    the lower level cache is a multiple size of the higher level cache, and
    the first and second fetching at least one of loads and stores at least one of data and instructions to the higher and lower level caches.

11. A system, comprising:
    a fetching unit to fetch a first threshold number of cache lines and a second threshold number of cache lines, the first and second threshold number of cache lines to be stored to a higher level cache and a lower level cache; and
    an access unit to access the first threshold number of cache lines, wherein
    the second threshold number of cache lines is to overwrite the first threshold number of caches lines at a first cache set of the higher level cache; and
    the access unit is to access the first threshold number of cache lines from a first cache set of the lower level cache.

12. The system of claim 11, wherein,
    the second threshold number of caches lines is stored to a second cache set of the lower level cache, and
    the lower level cache is greater in size than the higher level cache.

13. The system of claim 11, wherein,
    the access unit is to repeatedly access the first threshold number of cache lines from the first cache set of the lower level cache, and
    the access unit is check a validity of the first threshold number of cache lines.

14. A non-transitory computer-readable storage medium storing instructions that, if executed by a processor of a device, cause the processor to:
    allocate memory at a higher level cache and a lower level cache;
    fetch a first threshold number of cache lines to load to a first cache set of the higher and lower level caches;
    fetch a second threshold number of cache lines to overwrite the first cache set of the higher level cache and to store to the second cache set of the lower level cache; and
    access the first threshold number of cache lines directly from the lower level cache.

15. The non-transitory computer-readable storage medium of claim 14, wherein the memory is allocated via a monarch thread and a slave thread is halted while the lower level cache is accessed to test a validity of the first threshold number of cache lines.

* * * * *